Aug. 29, 1950  J. L. HATHAWAY  2,520,766
INTERMODULATION METER
Filed June 18, 1947  2 Sheets-Sheet 2
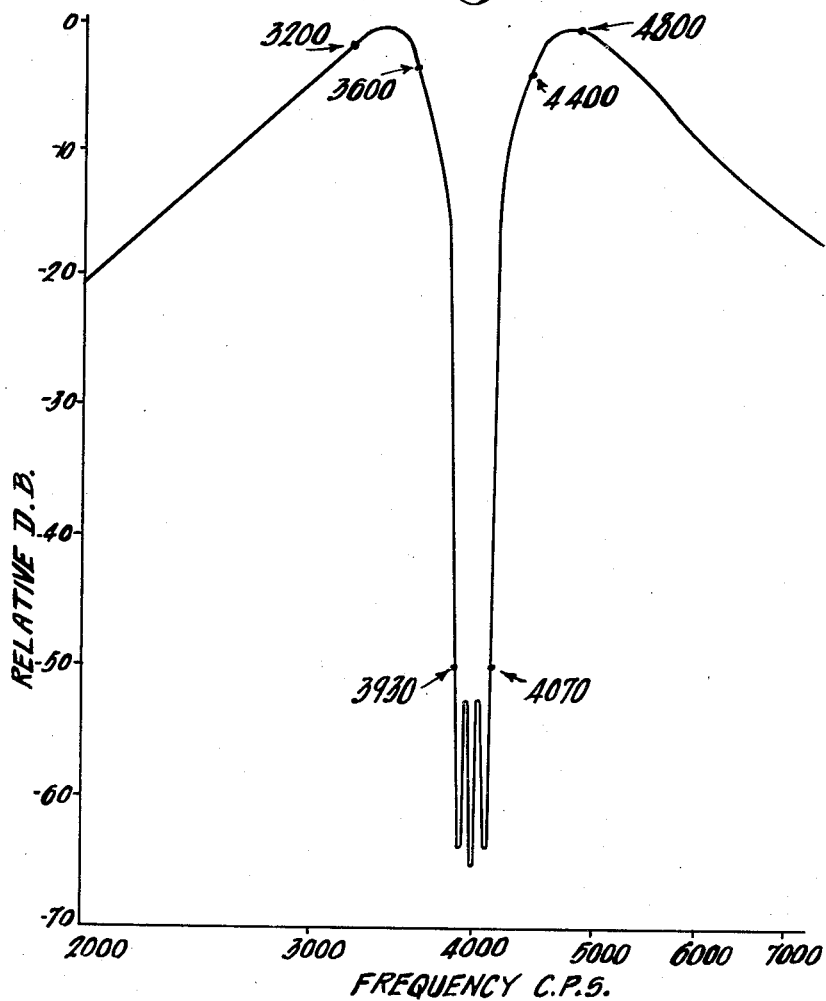
INVENTOR.
Jarrett L. Hathaway
BY [signature]
ATTORNEY Patented Aug. 29, 1950

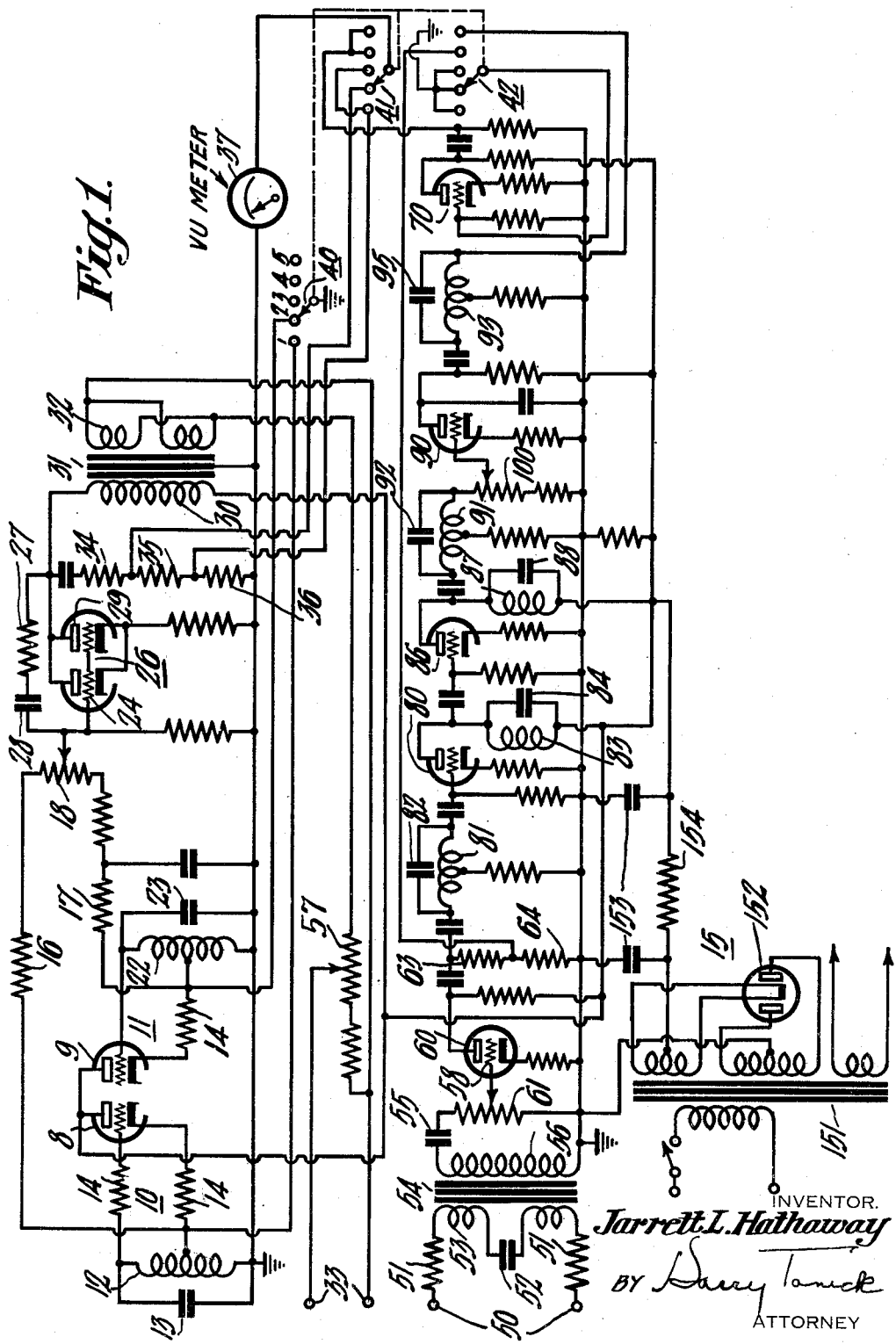

2,520,766

UNITED STATES PATENT OFFICE 2,520,766

INTERMODULATION METER

Jarrett L. Hathaway, Manhasset, N. Y., assignor to Radio Corporation of America, a corporation of Delaware Application June 18, 1947, Serial No. 755,503

13 Claims. (Cl. 179—171)

The present invention relates to measuring devices and more particularly to a device for measuring distortion in recordings, amplifiers, etc.

An object of the present invention is to provide a simplified system for measuring distortion in phonograph recordings and audio frequency amplifiers.

Another object of the present invention is the provision of a meter for measuring the intermodulation occurring when two or more frequencies are simultaneously applied to an amplifier or recorded on a record.

Another object of the present invention is the provision of an intermodulation meter as aforesaid which is less bulky and complicated than meters heretofore known.

Another object of the present invention is the provision of an intermodulation meter which operates on a single tone frequency combination.

While previously known intermodulation meters utilizing several tone frequency combinations are more versatile than the present arrangement, I have discovered that a single tone frequency in an intermodulation meter gives a satisfactory test of audible distortion. Furthermore, the use of a single tone frequency combination simplifies the structure of the intermodulation meter considerably and makes it lighter, more compact and more easily transportable. In tests which I have made of recordings with a single intermodulation tone combination, I have discovered that when the intermodulation of the single pair of tones measures low with the structure of the present invention, the recorded program sounded distortion free. Conversely, when the intermodulation was high as measured with the single tone frequency combination, the recorded program sounded distorted. It is thus felt that the present intermodulation method of distortion measurement in amplifiers and in recording systems is superior to heretofore known systems and is more easily accomplished.

When two tones of different frequency are combined in a nonlinear device, or in a device which distorts these frequencies, harmonics of each are produced. Also, sum and difference tones result, termed cross-modulation. With the present unit, tones of 400 and 4000 cycles per second are transmitted into the device under test and certain ones, only, of the spurious distortion tones measured. The most important harmonic and spurious tones encountered are those of the following frequencies: 800, 1200, 3200, 3600, 4400, 4800, 8000 and 12,000 cycles per second. Now, if all of these harmonic and spurious tones are to be measured to obtain an indication of the distortion produced, the system under measurement must be flat up to at least 12,000 cycles per second. However, the present intermodulation system measures the sum and difference frequencies of the 400 cycles per second and 4000 cycles per second tones which are located on each side of the 4000 cycles per second tone; that is, the tones of frequencies of 3200, 3600, 4400 and 4800 cycles per second. The present arrangement compares the total amplitude of these tones to that of the 4000 cycles per second tone. It will be noted that for this type of measurement a flat response over a wide frequency band is unnecessary. In fact, very little difference is noted even with fairly radical departures from a flat response.

The present arrangement includes wave generating means operating to generate tone frequencies of 400 cycles per second and 4000 cycles per second. These two tones are mixed in a predetermined proportion and at a predetermined amplitude and applied to the device under test. The output of the device under test is applied to a frequency selective network which first discriminates strongly against the 400 cycles per second tone. The amplitude of the remaining tone is measured. Then, further selective networks are inserted in the output of the device under test, these further selective networks being arranged to strongly discriminate against the 4000 cycles per second tone but to pass the major intermodulation products; that is, 3200, 3600, 4400 and 4800 cycles per second. The combined amplitude of the intermodulation products is then measured. The ratio of the amplitude of the intermodulation products and the 4000 cycles per second tone plus the intermodulation products is a measure of the amount of distortion caused by the device under test.

The present invention will be more fully understood by reference to the following detailed description which is accompanied by a drawing in which:

Figure 1 illustrates, in diagrammatic form, an embodiment of the invention, while Figure 2 is a curve showing the action of the selective networks in a portion of the arrangement of Figure 1.

Referring now to Figure 1, the double triode 8, 9 has its separate sections coupled to resonant circuits to form a 4000 cycle tone generator 10 and a 400 cycle tone generator 11. Thus, the triode 8 is coupled to a tank circuit including inductance 12 and capacity 13 tuned to 4000 cycles per second. The triode 9 has its grid and cathode coupled to a tank circuit including inductance 22 and capacity 23 tuned to 400 cycles per second. Resistors 14 are coupled between the tuned circuits and the electrodes of tubes 8 and 9 to provide resistance stabilization of the oscillators whereby their amplitude is maintained substantially constant in spite of changes in supply voltage. The anode supply for generators 10 and 11 as well as for the remaining tubes in the device is supplied by a conventional power supply including transformer 151, full wave rectifier 152 and a filter arrangement including condenser 153 and series resistance 154. The output from the 4000 and 400 cycle tone generators 10 and 11 is taken from taps on inductances 12 and 22 through resistors 16 and 17 to the opposite ends of variable voltage divider resistor 18. The control grid 24 of a triode amplifier 26 is connected to the variable tap on resistor 18. Thus, when the variable tap is placed at the top end of resistor 18 substantially all of the input to control grid 24 comes from the tone generator 10, while when the variable tap is at the bottom of resistor 18 substantially all of the input which is applied to control grid 24 comes from the tone generator 11. In order to minimize distortion a certain amount of negative feed back may be applied to the amplifier including tube 26 by means of resistor 27 and condenser 28 connected from anode 29 to grid 24. The anode 29 is connected through the primary 30 of the output transformer 31 to the source of anode potential anode supply 15. The secondary winding 32 of the output transformer 31 is connected to terminals 33 to which the input of the device under test is to be connected. Across the anode circuit of tube 26 is connected a voltage divider including serially connected resistors 34, 35 and 36. The VU meter 37 is arranged to be connected across selected portions of the voltage divider constituted by resistors 34, 35 and 36 by means of the selective action of switch 41. Switches 40, 41 and 42, as indicated by the dotted line, are ganged together for simultaneous operation. Thus, in positions 1, 2 and 3 of the switch gang the VU meter 37 is arranged to be selectively connected across portions of the voltage divider gang 34, 35 and 36. Switch 40 of the switch gang in position 1 disables the tone generator 10. At the same time VU meter 37 is connected across resistor 36 so that its reading is related to the total signal amplitude across the anode circuit of the tube 29 as the value of resistor 36 is related to the total resistance of 34, 35 and 36. Therefore, the VU meter gives a reading proportional to the amount of tone generated by a tone generator 11 appearing in the anode circuit of amplifier tube 26. In position 2 of the switch gang the output circuit of the tone generator 11 is disabled. The VU meter 37 is connected across 35 and 36 and the VU meter reading is related to the total amplitude of the tone generated by tone generator 10 appearing in the anode circuit of amplifier tube 26 as the value of the resistors 35 and 36 is related to the total resistance of 34, 35 and 36. Resistors 35 and 36 are so proportioned that equal readings are obtained on the VU meter 37 for a 4:1 ratio of the 4000 cycle tone to the 400 cycle tone. The VU meter 37 is coupled to primary side of transformer 31 rather than to the output winding 32 because the meter requires higher voltage for its operation than is available across secondary winding 32. However, the voltages are in direct proportion so the operation of the system is not affected by this connection. The output of the system under test is coupled to terminals 50 which are connected through resistors 51 and condenser 52 to the primary 53 of an input transformer 54. Condenser 52 is so related to the inductance of the primary winding 53 as to discriminate against frequencies much below 4000 cycles. Condenser 55 coupling the secondary 56 of the input transformer to the control grid 59 of the input tube 60 is also so dimensioned as to discriminate against frequencies much lower than 4000 cycles. The relative amplitude of signals applied to control grid 58 may be adjusted by suitably positioning the movable tap on input potentiometer 61. Across the output of tube 60 is connected a voltage divider including serially connected resistors 63 and 64. This divider is proportioned to afford the desired comparison of intermodulation products to 4000 cycle per second tone plus intermodulation products. A connection from the junction of the resistors goes to position 4 of switch 42. The arm of switch 42 is connected to the grid of amplifier tube 70. The output circuit of tube 70 is connected to taps 4 and 5 of switch 41. Thus, when switch 41 is in position 4 or 5, the VU meter 37 is connected to the output of amplifier tube 70 while the input of tube 70 may be selectively connected to the junction of resistors 63 and 64 or to the output of tube 90.

Connected to the output of amplifier tube 60 is a filter generally including amplifying tubes 80, 86 and 90 and associated tuned circuits 81—82; 83—84; 87—88; 91—92 and 93—95. In the grid circuit of tube 80 connected as a T network is a tuned circuit including inductance 81 and condenser 82 so dimensioned as to discriminate against frequencies of the order of 4000 cycles. The plate circuit of tube 80 includes a tuned circuit including inductance 83 and condenser 84 broadly tuned in the vicinity of 4000 cycles per second. Across tuned circuit 83—84 is connected the input of a further amplifier tube 86 which has coupled in its plate circuit a further tuned circuit including inductance 87 and capacity 88 of characteristics similar to 83—84. Between tubes 86 and 90 is coupled a further T network including inductance 91 and capacity 92 across the top of the T. This network is so dimensioned as to discriminate against frequencies of the order of 3960 cycles per second. The output of amplifier tube 90 is coupled to a final T network including across the top of the T a shunt tuned circuit including an inductance 93 and capacity 95 so dimensioned as to reject frequencies of the order of 4040 cycles per second.

The overall effect of the chain of filter networks and peaking circuits is to broadly accept frequencies within a fairly broad band centered about 4000 cycles per second except for frequencies of 3940, 4000 and 4060 cycles per second. The overall frequency response of the network between tube 60 and tube 70 is shown in Figure 2. It will be seen that for all frequencies between 3930 and 4070 cycles per second the rejection is in excess of 50 db. while for frequencies of the order of 3200, 3600, 4400 and 4800 cycles per second, as indicated by the dots on the curve, the response is down less than 3 db. For frequencies considerably remote from 4000 cycles, the response is down 20 db. or better.

The device described above may be operated in the following manner. The intermodulation meter tone output may be connected to the system under test by the use of terminals 33. If an overall recording system is to be measured the combination tone appearing at terminals 33 may feed a recording amplifier or other amplifiers located ahead of this in the recording channel. The tone may be recorded and later played back into the intermodulation meter by connecting the output of the play-back amplifier to terminals 50. It will thus be seen that the present arrangement permits measuring audible distortion including all amplifiers used in recording and playback as well as that occurring in the recording cutter, the pick-up and the record itself. If an individual amplifier is to be checked for intermodulation, the terminals 33 are connected to the input of the amplifier, and the amplifier output properly terminated, is returned to terminals 50 of the intermodulation meter.

The tone output fed into the system or amplifier under test may be adjusted by throwing the multiple ganged switches 40, 41 and 42 alternately between positions 1 and 2. The potentiometer 18 is adjusted so that the reading of VU meter 37 remains constant when the switch is thrown from one position to the other. It should be noted that the exact value of the reading of VU meter 37 is not important but the reading in the two positions of the switch should be approximately equal. The ganged switches may then be thrown to any one of the three remaining positions and the intermodulation tones of correct relative amplitude balance will be transmitted to terminals 33 at a level of the order of plus 4 VU.

The correct intermodulation tone level to be applied to the input of the system under test is adjusted by means of potentiometer 57 making certain that, if a cutter head is in the circuit, the tone is not allowed on long enough at a high level as to overheat the cutter and to cause damage. A normal operating tone level for testing program amplifiers is usually considered to be about 10 db. above the program VU meter readings since higher peak levels occur in programs than on pure tone signals. This high level cannot be used in cutting a record and it is therefore recommended that instead of 12 db. above program level, the tone level should be set about the same as program level.

Intermodulation readings may now be made by switching ganged switches 40, 41 and 42 from step 4, a reference step, to step 5 and equalizing the readings of meter 37 by adjusting the potentiometer 100. The position of the control of potentiometer 100 is a measure of the amount of intermodulation produced in the apparatus under test. It will be noted that when the ganged switches 40, 41 and 42 are on position 4, the VU meter reads as a function of the total amplitude of signals applied to input terminals 50 while in position 5 the meter reads the input level to terminals 50 minus the frequencies which have been eliminated by the filter shown between tube 69 and 70.

The potentiometer 100 may be directly calibrated in percentages by the following procedure. The input potentiometer 61 is set at any arbitrary value and a 4000 cycle input is applied to terminals 50. The amplitude of the input is varied until a clearly discernable reading appears on VU meter 37 and this reading noted. Then, a 3600 cycle wave of say one-tenth amplitude is applied to input terminals 50. The new setting to which potentiometer 100 must be adjusted to give the same reading as before may be marked with a numeral 10 indicating that the intermodulation product is equal to ten percent of the fundamental. Further, calibration marks may be obtained, for example, by successively changing the amplitude of the 3600 cycle wave to $1/5$, $1/20$, $1/100$ etc., of the amplitude of the 4000 cycle input and readjusting potentiometer 100 to again give the same reading on the VU meter 37. By marking each of the positions thus obtained in percentage and for as many other ratios as desired the potentiometer 100 may be calibrated as closely as necessary.

It will be noted that when tone from terminals 33 is fed into an amplifier or system operating appreciably below its maximum level, the readings obtained on VU meter 37 probably cannot be equalized on steps 4 and 5 of the input level adjustment potentiometer 61. This indicates that the apparatus under test is operating at such a low level that the intermodulation is far below the objectionable point. At high levels it will be found that the intermodulation rises quite rapidly. It has been determined that for an overall system, intermodulation values of 5% or less are quite good. The potentiometer 61 is provided as an input level control to adjust the amplitude of tones which are applied to terminals 50 to a value such as to afford a convenient "on scale" indication of the reference tone. Correct level is indicated, when the VU meter 37 on position 4 of the switches 40, 41 and 42, indicates well up scale, that is, above minus 10 VU and below plus 2 VU.

The output appearing at terminals 33 is satisfactory for feeding circuits having a characteristic impedance ranging from 100 ohms to infinity. The input impedance at terminals 50 is substantially infinite, that is, it is bridging.

While I have illustrated a particular embodiment of the present invention, it should be clearly understood that it is not limited thereto since many modifications may be made in the several elements employed and in their arrangement without departing from the spirit and scope of the invention.

What is claimed is:

1. A distortion measuring instrument including a source of high frequency wave energy and a source of wave energy of lower frequency, means for combining predetermined amounts of energy from each of said sources, means for applying said combined energies to the input of a device under test, means adapted to be coupled to the output of said device and responsive only to wave energy frequencies in a narrow frequency range adjacent to and on both sides of said high frequency source, means for determining the amplitude of wave energy at the output of said wave responsive means, a filter network coupled to said wave responsive means for discriminating against wave energy of frequencies in a narrower frequency range adjacent to and including the frequency of said high frequency source and means for determining the ratio of wave energy at the output of said filter to the wave energy at the output of said wave responsive means.

2. A distortion measuring instrument including a source of high frequency wave energy and a source of wave energy of lower frequency, means for combining predetermined amounts of energy from each of said sources, means for applying said combined energies to the input of a device under test, means adapted to be coupled to the output of said device and responsive only to wave energy frequencies in a narrow frequency range adjacent to and on both sides of said high frequency source, means for determining the amplitude of wave energy at the output of said wave responsive means, a filter network coupled to said wave responsive means for discriminating against wave energy of frequencies in a narrower frequency range adjacent to and including the frequency of said high frequency source, and means for selectively connecting a measuring instrument to the input and to the output of said filter network.

3. An intermodulation meter including a high frequency and a low frequency tone generator, a circuit coupled to said generators and adapted to combine predetermined amounts of each of said tones, connections for applying said combined tones to input terminals of a device under test, a first filter arranged to discriminate against said low frequency tone and adapted to be coupled to output terminals of said device, connections for coupling a meter to the output of said first filter, a second filter adapted to discriminate against said high frequency tone and against tones of frequencies closely adjacent said high frequency tone, the input of said second filter being coupled to the output of said first filter, and further connections for coupling said meter to the output of said second filter.

4. An intermodulation meter including a high frequency and a low frequency tone generator, a circuit coupled to said generators and adapted to combine predetermined amounts of each of said tones, connections for applying said combined tones to input terminals of a device under test, a first filter arranged to discriminate against said low frequency tone and adapted to be coupled to output terminals of said device, connections for coupling a meter to the output of said first filter, a second filter adapted to discriminate against said high frequency and against tones of frequencies closely adjacent said high frequency tone, said second filter also being coupled to said first filter and further connections for coupling said meter to the output of said second filter, said connections being selectively effective whereby the relative outputs of said two filters may be compared.

5. An intermodulation meter including a high frequency and a low frequency tone generator, a circuit coupled to said generators and adapted to combine predetermined amounts of each of said tones, connections for applying said combined tones to input terminals of a device under test, a first filter arranged to discriminate against said low frequency tone and adapted to be coupled to output terminals of said device, connections for coupling a meter to the output of said first filter, a second filter adapted to discriminate against tones of frequencies closely adjacent said high frequency tone and against said high frequency tones, said second filter also being coupled to said first filter, further connections for coupling said meter to the output of said second filter, said connections being selectively effective whereby the relative outputs of said two filters may be compared, and amplitude adjusting means in said second filter whereby said meter may be adjusted for equal readings in each of said selected connections, said amplitude adjusting means being calibrated in terms of decimal ratios of the output at closely adjacent frequencies to total output of said first filter.

6. The method of determining distortion produced in an amplifier including combining predetermined amplitudes of a high frequency and a low frequency tone, applying said combined tones to the input of said amplifier, measuring the amplitude of all tones in a narrow frequency range adjacent to and on both sides of said high frequency tone in the output of said amplifier, measuring the amplitude of tones in a still narrower frequency range immediately adjacent said high frequency tone, excluding said high frequency tone and tones of said narrower frequency range, and determining the ratio of the said two measurements.

7. The method of determining distortion produced in an audio frequency transducer system including combining predetermined amplitudes of a high frequency and a low frequency tone, applying said combined tones to the input of said system, measuring the amplitude of all tones in a narrow frequency range adjacent to and on both sides of said high frequency tone in the output of said system, measuring the amplitude of tones in a still narrower frequency range immediately adjacent said high frequency tone, excluding said high frequency tone and tones of said narrower frequency range, and determining the ratio of the said two measurements.

8. The method of determining distortion produced in an amplifier including combining a high frequency and a low frequency tone in a four to one ratio, applying said combined tones to the input of said amplifier, measuring the amplitude of all tones in a narrow frequency range adjacent to and on both sides of said high frequency tone in the output of said amplifier, measuring the amplitude of tones in a still narrower frequency range immediately adjacent said high frequency tone, excluding said high frequency tone and tones of said narrower frequency range and determining the ratio of the said two measurements.

9. The method of determining distortion produced in an audio frequency transducer system including combining a high frequency and a low frequency tone in a four to one ratio, applying said combined tones to the input of said transducer, measuring the amplitude of all tones in a narrow frequency range adjacent to and on both sides of said high frequency tone in the output of said transducer, measuring the amplitude of tones in a still narrower frequency range immediately adjacent said high frequency tone, excluding said high frequency tone and tones of said narrower frequency range and determining the ratio of the said two measurements.

10. The method of determining distortion produced in an amplifier including combining a high frequency and a low frequency tone in a four to one ratio, applying said combined tones to the input of said amplifier, selecting from the output of said amplifier all tones in a narrow frequency range adjacent to and on both side of said high frequency tone, measuring the combined amplitude of said tones, discriminating against said high frequency tone, measuring the amplitude of the remainder and determining the ratio of said two measurements.

11. The method of determining distortion produced in an audio frequency transducer system including combining a high frequency and a low frequency tone in a four to one ratio, applying said combined tones to the input of said transducer, selecting from the output of said transducer all tones in a narrow frequency range adjacent to and on both sides of said high frequency tone, measuring the combined amplitude of said tones, discriminating against said high frequency tone and tones of a still narrower frequency range immediately adjacent said high frequency tone, measuring the amplitude of the remainder and determining the ratio of said two measurements.

12. An intermodulation meter including a high frequency and a low frequency tone generator, an amplifier having an input circuit coupled to both of said generators, said coupling being variable so that the relative amounts of said tones applied to said input may be adjusted, the output circuit of the amplifier being adapted to be coupled to the input circuit of a device to be tested, a VU meter adapted to be coupled to said output circuit, means for selectively disabling first one and then the other of said tone generators, a voltage divider network across said output circuit having a pair of taps thereon so disposed that the voltages thereacross are in a ratio of four to one, means for connecting the VU meter to the higher of said taps when said high frequency generator is disabled and the other when said low frequency generator is disabled, a filter network adapted to be coupled to the output of said device and adapted to discriminate against low frequency tones, a second filter and amplifier network coupled to said first filter, said second filter being adapted to discriminate against tones of frequencies equal to and closely adjacent said high frequency tones, switching means for selectively connecting said meter to the input and to the output of said second filter, a potential divider in said second filter and means for so adjusting said divider as to obtain equal readings on said meter from the input and output of said second filter.

13. An intermodulation meter including a high frequency and a low frequency tone generator, an amplifier having an input circuit coupled to both of said generators, said coupling being variable so that the relative amounts of said tones applied to said input may be adjusted, the output circuit of the amplifier being adapted to be coupled to the input circuit of a device to be tested, a filter network adapted to be coupled to the output of said device and adapted to discriminate against low frequency tones, a second filter and amplifier network coupled to said first filter, said second filter being adapted to discriminate against tones of frequencies equal to and closely adjacent said high frequency tone, switching means for selectively connecting a VU meter to the input and to the output of said second filter, a potential divider in said second filter and means for so adjusting said divider as to obtain equal readings on said meter from the input and output of said second filter.

JARRETT L. HATHAWAY.

REFERENCES CITED

The following references are of record in the file of this patent:

UNITED STATES PATENTS

| Number | Name | Date |
|---|---|---|
| 2,143,094 | Swift | Jan. 10, 1939 |
| 2,213,099 | Adorjan | Aug. 27, 1940 |
| 2,385,186 | Bayless | Sept. 18, 1945 |